United States Patent
Hawkins

(10) Patent No.: US 9,958,528 B2
(45) Date of Patent: May 1, 2018

(54) DETERMINING A YAW DIRECTION OF A WIND TURBINE

(71) Applicant: SIEMENS AKTIENGESELLSCHAFT, München (DE)

(72) Inventor: Samuel H. Hawkins, Sheffield (GB)

(73) Assignee: SIEMENS AKTIENGESELLSCAFT (DE)

( * ) Notice: Subject to any disclaimer, the term of this patent is extended or adjusted under 35 U.S.C. 154(b) by 265 days.

(21) Appl. No.: 14/705,096

(22) Filed: May 6, 2015

(65) Prior Publication Data
US 2016/0032897 A1   Feb. 4, 2016

(30) Foreign Application Priority Data
Jul. 31, 2014   (EP) .................................. 14179302

(51) Int. Cl.
| | |
|---|---|
| *G01S 3/54* | (2006.01) |
| *F03D 7/02* | (2006.01) |
| *G01S 3/52* | (2006.01) |
| *F03D 17/00* | (2016.01) |

(52) U.S. Cl.
CPC .............. *G01S 3/54* (2013.01); *F03D 7/0204* (2013.01); *F03D 17/00* (2016.05); *G01S 3/52* (2013.01); *Y02E 10/721* (2013.01); *Y02E 10/723* (2013.01)

(58) Field of Classification Search
CPC . G01S 3/52; G01S 3/54; F03D 7/0204; F03D 7/042; F03D 7/048; F03D 1/06; F03D 17/00; G01C 21/206; G06F 17/3087; Y02E 10/721; Y02E 10/723; F03C 17/00
USPC ......................................................... 342/418
See application file for complete search history.

(56) References Cited

U.S. PATENT DOCUMENTS

| | | | |
|---|---|---|---|
| 5,321,410 A | 6/1994 | Hipp et al. | |
| 5,426,438 A | 6/1995 | Peavey et al. | |
| 5,977,913 A * | 11/1999 | Christ ................. | G01C 21/206 340/524 |
| 8,093,738 B2 * | 1/2012 | Stiesdal ............... | F03D 7/0204 290/44 |
| 2003/0034887 A1 * | 2/2003 | Crabtree ................. | G01S 3/54 340/539.1 |

(Continued)

FOREIGN PATENT DOCUMENTS

| | | |
|---|---|---|
| EP | 2559993 A1 | 2/2013 |
| EP | 2599993 B1 * | 4/2016 ........... F03D 7/0204 |

OTHER PUBLICATIONS

Extended European Search Report for Applcation No. 14179302.6, dated Jan. 22, 2015.

*Primary Examiner* — Bernarr E Gregory
*Assistant Examiner* — Fred H Mull
(74) *Attorney, Agent, or Firm* — Schmeiser Olsen & Watts LLP

(57) ABSTRACT

A method for determining a yaw direction of a wind turbine includes the following steps, receiving at a component of the wind turbine a signal broadcasted from a source, determining a direction from the component towards the source based on the received signal, determining the yaw direction of the wind turbine in relation to the determined direction towards the source is provided. Further, a wind turbine and a device as well as a computer program product and a computer readable medium are disclosed for performing the method.

14 Claims, 4 Drawing Sheets

(56) References Cited

U.S. PATENT DOCUMENTS

| | | | |
|---|---|---|---|
| 2010/0092289 A1* | 4/2010 | Altenschulte | F03D 7/0204 416/9 |
| 2010/0143128 A1* | 6/2010 | McCorkendale | F03D 7/0204 416/61 |
| 2010/0253569 A1* | 10/2010 | Stiesdal | F03D 17/00 342/118 |
| 2011/0268569 A1* | 11/2011 | Loh | F03D 7/042 416/1 |
| 2012/0134807 A1* | 5/2012 | Axelsson | F03D 7/0204 416/1 |
| 2013/0317748 A1* | 11/2013 | Obrecht | F03D 7/048 702/3 |
| 2015/0081207 A1* | 3/2015 | Briant | G06F 17/3087 701/410 |

* cited by examiner

DETERMINING A YAW DIRECTION OF A WIND TURBINE

CROSS-REFERENCE TO RELATED APPLICATIONS

This application claims priority to European Application No. EP 14179302.6, having a filing date of Jul. 31, 2014, the entire contents of which are hereby incorporated by reference.

FIELD OF TECHNOLOGY

The following relates to a method, a wind turbine and to a device for determining a yaw direction of a wind turbine. In addition, an according computer program product and a computer readable medium are suggested.

BACKGROUND

A wind turbine in operation will not always experience wind perpendicular to a rotor plane. When the rotor plane (which is also referred to as heading) of a wind turbine is not perpendicular to the wind, the efficiency will decrease. Therefore, actual wind turbines comprise a yaw system designed to automatically adjust their heading, like, e.g., rotating the rotor plane perpendicular to the incoming wind or to maintain an angle relative to the wind to maximize the surface area of the turbine rotor.

Usually, the yaw system is part of a nacelle, which may be involved in a yawing movement, i.e. being rotatable mounted on top of a tower via at least one yaw bearing. A rotor is attached to an upwind side of the nacelle. The rotor is coupled via a drive train to a generator housed inside the nacelle. The rotor includes a central rotor hub and a plurality of blades mounted to and extending radially from the rotor hub defining the rotor plane.

It is important for wind power plant operators to know an actual position or direction of the rotor plane or heading of the respective wind turbine, the plane or heading being correlated with an actual position or direction of the nacelle. The actual direction of the nacelle is also referred to as a yaw direction or a yaw position or, in relation to a predefined direction (e.g. a cardinal direction), as a yaw angle. Alternatively the yaw angle may be defined as the direction of the nacelle in relation of the direction of the incoming wind.

FIG. 1 shows in a schematically top view an exemplary scenario of a wind turbine 100 in relation to the well known cardinal points or compass points which are indicated as a compass rose in the background of FIG. 1. A rotor hub 120 including a plurality of blades 130 defining a rotor plane 140 is mounted at the upwind side of a nacelle 110. According to the scenario of FIG. 1, an actual yaw direction 150 (which is also referred to as "compass heading") of the wind turbine 100, i.e. the actual direction of the nacelle 110 points towards the cardinal direction "North East" or "NE". As exemplarily shown in FIG. 1, an absolute yaw angle "$\theta_{YawAngle}$" is referencing the actual yaw direction 150 of the wind turbine in relation towards the cardinal direction "North" or "N". The absolute yaw angle $\theta_{YawAngle}$ is indicated by an arrow 160, wherein $\theta_{YawAngle}=45°$.

Information concerning the yaw direction is a common used basis for analyzing data concerning a wind turbine or performing sector management control like, e.g.,

- site wind mapping and historical data collection on wind patterns,
- limiting wind turbine noise by avoiding operation in wind directions where noise generation is excessive,
- automatic curtailment and regulation of a wind turbine at yaw angles where significant wind turbulence might be present,
- prevention of shadow flicker/light pollution for neighboring residents or businesses at certain times of day and yaw angles,
- remote manual control of a wind turbine yaw position,
- efficiency testing and wind turbine power curve validation, or
- safe positioning of the rotor during ice conditions when service teams are approaching.

In order to determine, e.g., an absolute yaw angle, a wind turbine may be equipped with a yaw encoder, measuring the relative yaw direction in relation to a stationary object like, e.g., a tower being secured to a foundation at ground level. The yaw encoder is typically calibrated by determining a reference yaw direction or reference yaw angle after finalization of the wind turbine installation.

In some scenarios the initial calibration of the yaw angle is incorrect or less accurate due to applying a rough estimate or rule of thumb to determine a cardinal direction as a basis or reference for the yaw angle calibration.

A further possible reason for an inaccurate yaw angle calibration is a wind turbine installation based on a design including powerful permanent magnets, eliminating the possibility of applying magnetic compasses to determine the yaw direction or yaw angle. A magnetic compass, as a further general disadvantage, comprises inaccurateness per se, in particular at installations located at high geographic latitudes.

Alternatively, compasses based on GPS (Global Positioning System) or other satellite-based positioning systems have been applied to determine the reference yaw direction of the wind turbine.

[EP 2 599 993 A1] refers to a method to determine the yaw angle of a component of a wind turbine wherein at least one receiver of an automated and autonomous positioning system is used to generate position-data of the receiver. The receiver is arranged at a wind turbine location being subjected to a yawing movement.

However, applying such kind of automated and autonomous positioning systems for calibration issues is restricted due to high costs and limited accuracy.

SUMMARY

An aspect relates to improving the approach for determining an accurate yaw direction and/or yaw angle of a wind turbine.

A further aspect relates to a method is provided for determining a yaw direction of a wind turbine comprising the following steps,

- receiving at a component of the wind turbine a signal broadcasted from a source,
- determining a direction from the component towards the source based on the received signal, and
- determining the yaw direction of the wind turbine in relation to the determined direction towards the source.

Determining the yaw direction based on a received signal broadcasted from a source can be implemented into a wind turbine in a cost effective way. As a further advantage, no active yawing movement of the wind turbine is necessary to enable the determination of the yaw direction with sufficient accuracy, i.e., the determination of the yaw direction is possible even when the wind turbine is stationary.

In an embodiment, the yaw direction is determined based on a Radio Direction Finding (RDF) method.

In another embodiment, the Radio Direction Finding method is based on a Pseudo-Doppler method. Implementing RDF based on a Pseudo-Doppler method can be implemented at a very low cost wherein the results of the RDF are based on a high quality.

In a further embodiment,
the signal is received via an antenna and/or receiver being attached to the component, the antenna and/or receiver having a calibrated 0°-direction in relation to a direction of the component,
an offset angle is determined based on the calibrated 0°-direction in relation to the determined direction, and
the yaw direction is determined based on the offset angle and the determined direction.

In a next embodiment,
the signal is broadcasted from the source located at a source-specific geographic position,
the broadcasted signal is received at a component-specific geographic position,
a relative compass heading is derived by processing the component-specific geographic position and the source-specific geographic position, and
a yaw angle of the wind turbine is derived based
on the offset angle, and
on the relative compass heading.

The relative compass heading or the relative cardinal direction between the receiver and transmitter of a broadcasted signal may be determined by comparing, i.e., processing respective coordinates of the geographic positions according to, e.g., triangular calculations. Such processing based on standardized geographic coordinate systems is well known and will be shortly summarized at the end of the description.

It is also an embodiment that the yaw angle is determined in relation towards a defined cardinal direction. By determining the yaw angle in relation towards a defined cardinal direction the resulting yaw direction and/or yaw angle (which is also referred to as "absolute yaw direction and/or angle") can be determined with sufficient accuracy for each wind turbine of a wind park installation individually. As an example, the individual yaw angle/direction may be determined for each wind turbine in relation to the cardinal direction "North".

Pursuant to another embodiment, the broadcasted signal is received at a nacelle or rotor of the wind turbine. Basically, the broadcasted signal may be received via an antenna or receiver located at any part of the wind turbine being involved in yawing or rotating movement causing a change in the direction between the antenna/receiver and the source of the signal.

According to an embodiment, the yaw direction is determined
continuously, or
periodically, or
within at least one defined time interval, or
one-time.

As an advantage, the power consumption of the transmitter can be optimized, i.e. the waste of energy minimized. As an example, for power consumption purposes, the transmitter could be timed to broadcast the signal at regular intervals (i.e. every 24 hours) in conjunction with receivers mounted on the wind turbine.

According to another embodiment, the geographic position is defined according to a Geographic Latitude and Longitude coordinate system, or
an Universal Transverse Mercator (UTM) coordinate system, or
an Universal Polar Stereographic (UPS) coordinate system.

The problem stated above is also solved by a wind turbine comprising
a receiver for receiving a signal broadcasted from a source, and
a processing unit that is arranged for
determining a direction from the receiver towards the source based on the received signal,
determining the yaw direction of the wind turbine in relation to the determined direction towards the source.

The problem stated above is also solved by a device comprising and/or being associated with a processor unit and/or hard-wired circuit and/or a logic device that is arranged such that the method as described herein is executable thereon.

In a further embodiment, the device is a yaw encoder.

The solution provided herein further comprises a computer program product directly loadable into a memory of a digital computer, comprising software code portions for performing the steps of the method as described herein.

In addition, the problem stated above, is solved by a computer readable medium, having computer-executable instructions adapted to cause a computer system to perform the steps of the method as described herein.

BRIEF DESCRIPTION

Some of the embodiments will be described in detail, with reference to the following figures, wherein like designations denote like members, wherein.

Figure 3:
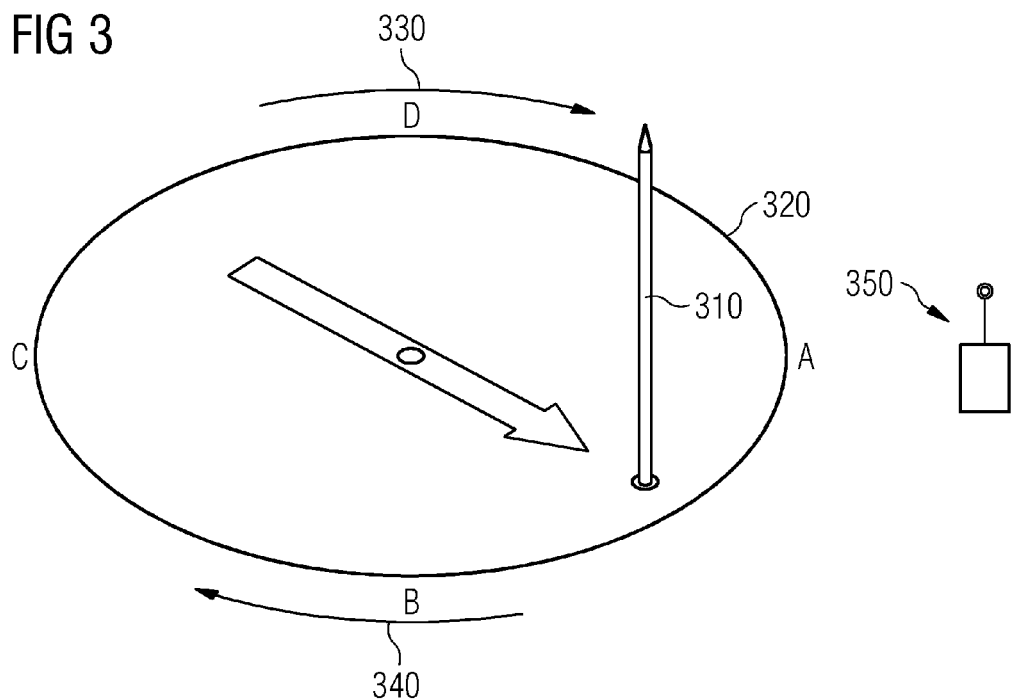
Figure 4:
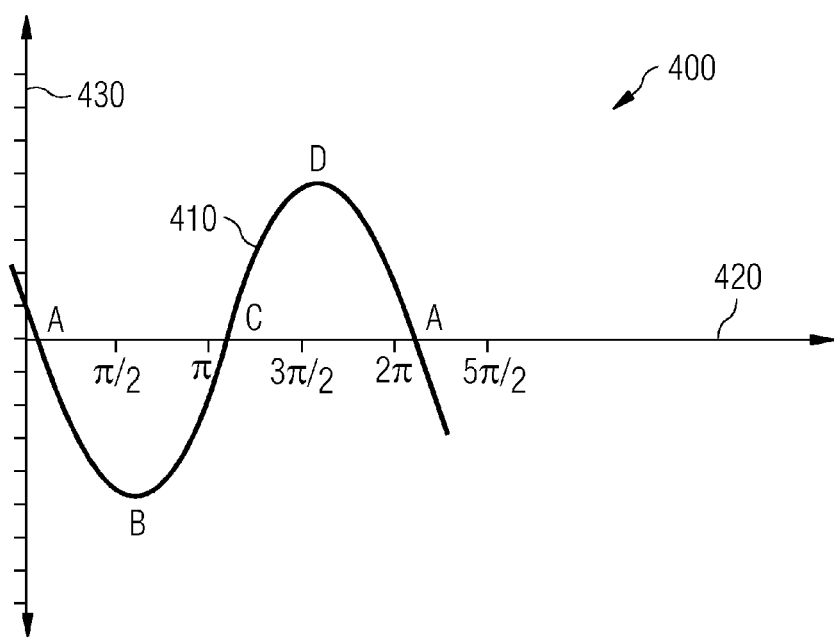
Figure 5:
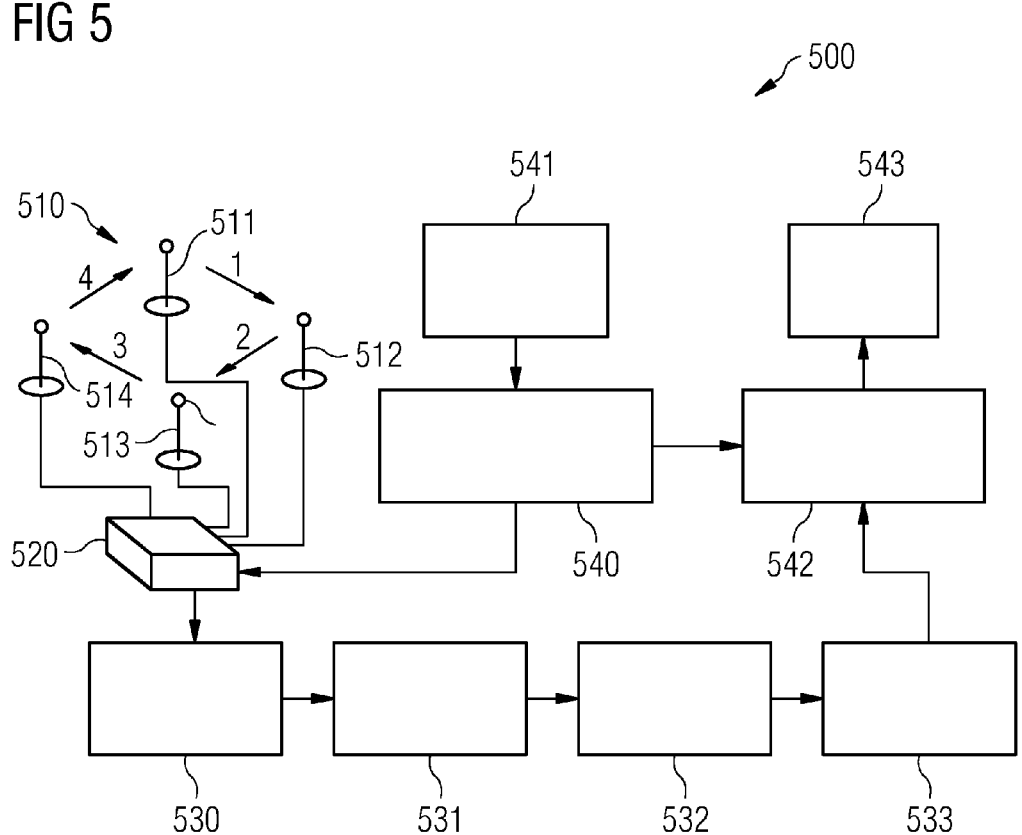

FIG. 3 exemplarily illustrates in a schematic view a basic principle of the original Doppler-RDF;

FIG. 4 illustrates in a graph a more detailed view of a sinusoidal curve representing the wavelength/frequency of a received signal according to Doppler-RDF; and FIG. 5 shows in a block diagram a possible embodiment of a Pseudo-Doppler RDF receiver.

DETAILED DESCRIPTION

Figure 1:
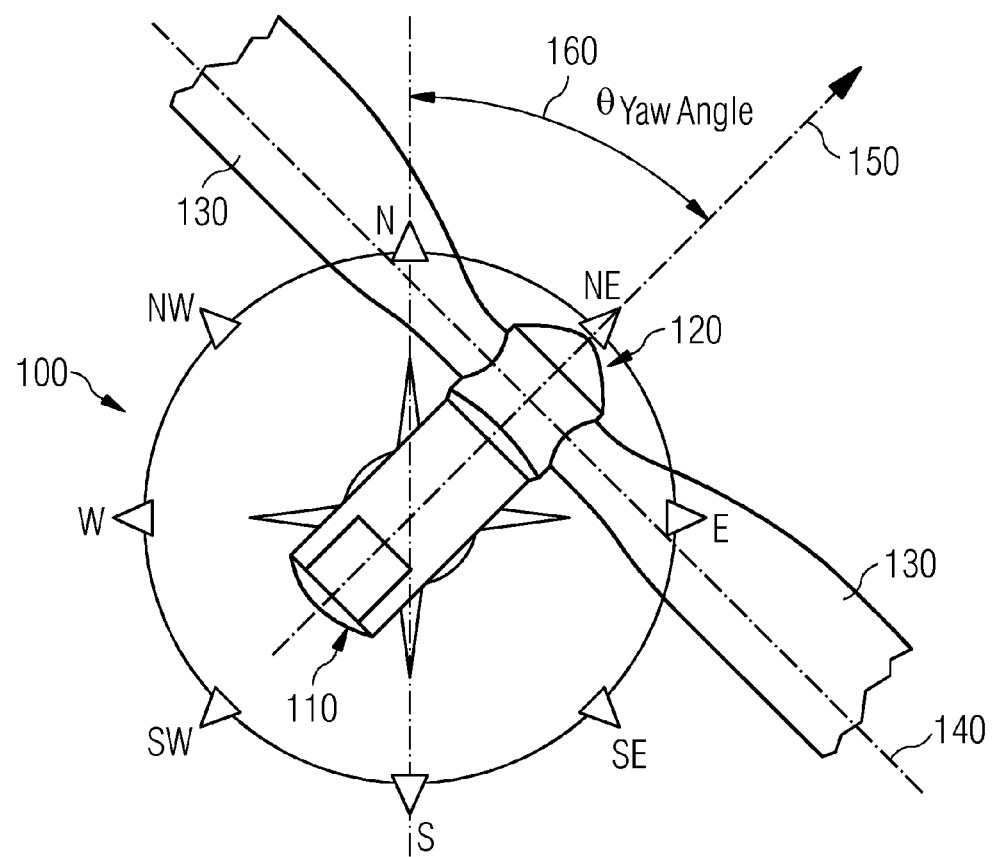
FIG. 1 shows in a schematically top view an exemplary scenario of a wind turbine in relation to the well-known cardinal points or compass points which are indicated as a compass rose in the background.
Figure 2:
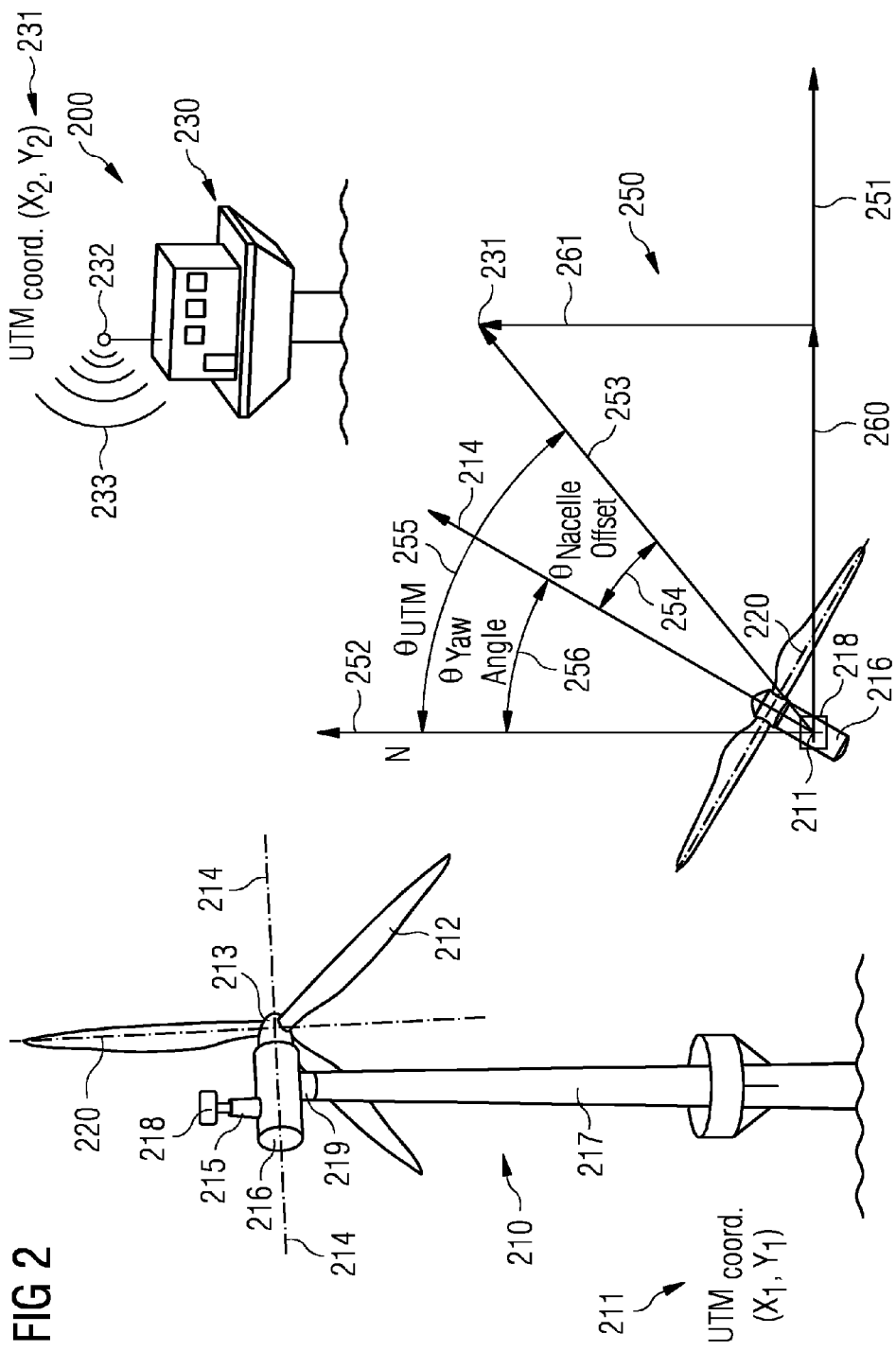
FIG. 2 shows an exemplary scenario of an off-shore wind park installation.

FIG. 2 shows an exemplary scenario of an off-shore wind park installation 200 thereby illustrating a determination of a yaw direction of a wind turbine according to the proposed solution.

According to the example of FIG. 2 an off-shore wind turbine 210 is located at a specific geographic position 211. The geographic position 211 may be exemplarily defined according the UTM (Universal Transverse Mercator) coordinate system comprising a first datum or coordinate $X_1$ (also called "eastings") and a second datum or coordinate $Y_1$ (also called "northings").

The wind turbine 210 comprises a nacelle 216 being rotatable mounted on top of a tower 217 via a yawing system 219. A rotor is attached to an upwind side of the nacelle 216. The rotor includes a central rotor hub 213 and a plurality of blades 212 mounted to and extending radially from the rotor hub 213 defining a rotor plane 220.

The nacelle 216 may be involved in a yawing movement, e.g., rotating the rotor plane 220 perpendicular to an incoming wind.

As a further exemplary member of the off-shore wind park installation 200 an electrical substation 230 is located at a specific geographic position 231 which is different from the geographic position 211 of the wind turbine 210. The geographic position 231 may be also defined according to the UTM (Universal Transverse Mercator) coordinate system comprising a first datum or coordinate $X_2$ and a second datum or coordinate $Y_2$.

The substation 230 includes a transmitter 232 representing a source of a radio signal 233 being broadcasted to be processed with the help of a Radio Direction Finding (RDF) method.

Radio Direction Finding (RDF) refers to the determination of a direction from which a received signal is transmitted thereby using a specialized antenna or antenna system in combination with triangulation to identify the precise location or direction of a transmitter, i.e. the source of the broadcasted signal. This may exemplarily refer to radio or to other forms of wireless communication.

As shown in FIG. 2, the signal 233 broadcasted from the transmitter 232 is received by a receiver 215 attached on top of the nacelle 216. According to the proposed solution, the receiver 215 comprises an antenna 218, both configured as a Radio Direction Finder or RDF receiver for finding or determining a direction towards the source 232 of the signal 233. In the scenario 200, the antenna 218 is configured according to a single-channel RDF system which is based on the use of a multi-antenna array in combination with the receiver 215 as a single channel radio receiver.

Thereby, the antenna array 218 may be installed or calibrated such on the top of the nacelle 216, that a 0°-position or 0°-direction of the RDF receiver is equal to a forward facing direction of the wind turbine 210, i.e., is in line with an actual yaw direction 214 of the nacelle 216.

Two main categories are applicable for single-channel direction finding:
  direction finding based on amplitude comparison
  direction finding based on phase comparison According to an exemplary embodiment of the scenario 200 illustrated in FIG. 2, the applied RDF method is based on a Pseudo-Doppler method ("Doppler-RDF"). Doppler-DRF is a phase-based direction finding method producing a direction estimate based on the received signal 233 by measuring a Doppler-shift induced on the signal at the antenna 218 of the RDF receiver by sampling around the elements of a circular antenna array.

FIG. 3 exemplarily illustrates in a schematic view the principle of the original Doppler-RDF using a single antenna 310 that physically moves along a circle or rotating platform 320. In short, when the antenna 310 moves in a direction 330 towards a transmitter 350 representing a source of a signal, the antenna 310 detects a signal with a shorter wavelength, i.e. a signal with a higher frequency. On the contrary, when the antenna 310 is moving in a direction 340 away from the transmitter 350, the antenna 310 detects a signal with a longer wavelength, i.e. a signal with a lower frequency.

Using this principle, an antenna mounted on a rotating platform as shown in FIG. 3 would detect a wavelength of the received signal which increases and decreases sinusoidal in relation to the frequency of the signal as originally emitted from the transmitter.

FIG. 4 illustrates in a graph 400 a more detailed view of a sinusoidal curve 410 representing the wavelength/frequency of a signal received via an antenna 310 as shown in FIG. 3. Thereby, an abscissa 420 of the graph 400 is representing the angular position of the antenna 310 and an ordinate 430 is representing a Doppler-shift frequency of the received signal indicating a level of increase or decrease of the frequency of the received signal in relation to the frequency of the signal as originally emitted from the transmitter 350.

When the antenna 310 is moving towards (i.e. towards direction 330) the source 350 (i.e. position "D" in FIG. 3), the wavelength of the received signal is at a local minimum, i.e. the Doppler-shift frequency is at a maximum (i.e. position "D" in FIG. 4).

When the antenna 310 is at a position nearest to the source of the signal (i.e. at position "A" in FIG. 3) the wavelength of the received signal is unchanged, i.e. the Doppler-shift frequency is zero (i.e. at position "A" in FIG. 4).

When the antenna 310 is moving away (i.e. towards direction 340) from the source 350 (i.e. at position "B" in FIG. 3) the wavelength of the received signal is at a local maximum, i.e. the Doppler-shift frequency is at a minimum (i.e. at position "B" in FIG. 4).

When the antenna 310 is at a position with a maximum distance to the source 350 of the signal (i.e. at position "C" in FIG. 3) the wavelength of the received signal is unchanged, i.e. the Doppler-shift frequency is zero (i.e. at position "C" in FIG. 4).

Consequently, those sections in the graph 400 without any Doppler-shift, and in particular such areas in curve 410 marking an angular position with a decreasing "zero crossing" towards the abscissa 420 (i.e. position "A" in the curve 410) are representing those positions of the antenna 310 closest to the source of the signal (i.e. at position "A" in FIG. 3). Thus, applying a decreasing zero crossing detection in graph 400 results in an accurate indication of the direction towards the source of the received signal.

In practical applications of Doppler-RDF a physically rotating disc would have to be moving at a very high rotating velocity to make the Doppler-shift "visible". Because of this limitation, Pseudo-Doppler RDF was developed simulating the rotation of the antenna disc electronically.

FIG. 5 shows in a block diagram a possible embodiment of a Pseudo-Doppler RDF receiver 500. Pseudo-Doppler RDF is based on an antenna array 510 including multiple antennas 511 . . . 514. Each antenna 511 . . . 514 is connected to an antenna controller 520. The antenna controller 520 is connected to a FM (Frequency Modulation) receiver 530 which is communicating with a demodulator 521. The demodulator 521 is coupled to a band pass filter 532 which is connected to a zero-crossing detector 533.

The antenna controller 520 is further connected to an antenna position selector/multiplexer 540 driven by a clocking signal unit 541. The antenna position selector/multiplexer 540 is further coupled to a direction comparator 542 which is also communicating with the zero-crossing detector 533. The direction comparator 542 is further communicating with an orientation output 543 indicating the resulting direction of the source of the signal received at the antenna array 510.

According to FIG. 5, signal reception at the antenna array 510 is rapidly shifted (indicated by a sequence "1-2-3-4" in FIG. 5) from antenna to antenna 511 . . . 514 driven by the antenna position selector/multiplexer 540 in combination with the controller 520 thereby simulating a single antenna rotating rapidly on a disc. As an example, for UHF (Ultra High Frequency) signals the rotation speed may be about 500 Hz.

After receiving the frequency modulated signal via the antenna array 510 and further processing via the FM receiver 530, the received signal will be demodulated by the demodulator 531. After demodulation, the frequency of the processed signal is equal to the frequency of the pseudo antenna rotation. After a band pass filtering via the filter 532 the positions with decreasing zero-crossings of the Doppler-shift frequency can be identified by the zero-crossing-detector 533 in combination with the direction comparator 542. Based on the identified zero-crossings, the resulting direction from the antenna 510 towards or in relation to the source of the received signal will be indicated via the orientation output 543.

Further, dependent from the calibration of the 0°-position or 0°-direction of the Pseudo-Doppler RDF receiver 500, a relative offset between the 0°-position/direction, e.g. the actual yaw direction of the nacelle and the identified direction towards the source of the received signal may be also presented as a further result at the orientation output 543.

The Pseudo-Doppler RDF receiver 500 as presented in FIG. 5 may be part of a yaw encoder of the wind turbine.

It should be noted, that each kind of Radio Direction Finding (RDF) method may be used for implementing the proposed solution.

Applying Pseudo-Doppler RDF may be the preferred solution for the following reasons:
  antenna array and processor can be sourced at very low cost,
  antenna array can be small for UHF frequency band (15 cm×15 cm or smaller),
  small individual antenna length (whip style length around 19 cm for 400 MHz),
  high degree of accuracy (<1 degree to 5 degrees depending on design),
  possibility to identify beacon direction at all angles, and no direction aliasing Regarding the signal being broadcasted, a transmitter representing the source of the signal may broadcast a steady signal at a constant reference frequency. As an example, the UHF frequency band (300 MHz to 1 GHz) may be the preferred frequency range for the broadcast due to the following reasons:
  multiple UHF frequencies are available for public use,
  UHF allows the use of compact antenna systems (<1 m), and
  UHF is best for medium range line of site applications such as a large wind farms In the following, the determination of the actual yaw direction of wind turbine according to the proposed solution will be explained in more detail.

For that, a further diagram 250 is embedded in FIG. 2 visualizing in top-view a geographical situation of the off-shore scenario 200. At the bottom left side of the diagram 250 the nacelle 216 is indicated in top-view together with the antenna 218 located at the origin of the diagram 250 representing the geographic position 211. Accordingly, the geographic location of the substation 230, in particular the geographic position 231 of the transmitter 232 is indicated at the upper right side of the diagram 250.

It should be noted, that the geographic positions 211, 231 maybe defined according to any geographic coordinate system enabling every location on earth to be specified by a set of numbers or letters which are also referred to as coordinates. Such coordinates are often chosen such that one of the numbers represents a vertical position and two or three of the numbers represent a horizontal position. Examples for geographic coordinate systems are "Geographic latitude and longitude" or "UTM" (Universal Transverse Mercator) and "UPS" (Universal Polar Stereographic).

In the example shown in FIG. 2, the diagram 250 is configured according to UTM wherein an abscissa 251 is exemplarily representing a cardinal direction "East" and an ordinate 252 is representing a cardinal direction "North".

Alternatively, the abscissa 251 may represent a "Longitude" information and the ordinate 252 may represent a "Latitude" information according to the Geographic Latitude and Longitude system.

According to a first step of the proposed solution, a relative cardinal direction or a relative compass heading between the antenna or antenna array 218 of the wind turbine 210 and the transmitter 232 will be determined by comparing, i.e., processing the respective coordinates ($X_1$, $Y_1$, $X_2$, $Y_2$) of the geographic positions 211, 231 according to, e.g., triangular calculations. Such calculation of the relative compass heading based on a standardized geographic coordinate systems is well known and will be shortly summarized at the end of the description.

The resulting relative compass heading is indicated by an arrow 253 in the geographic diagram 250. According to FIG. 2, the relative compass heading 253 comprises a first coordinate (indicated by an arrow 260) representing the UTM-specific "eastings" and a second coordinate (indicated by an arrow 261) representing the UTM-specific "northings".

The relative compass heading 253 is permanent and will never change over time as long as the wind turbine 210, i.e. the antenna 218 and the substation 230, i.e. the transmitter 232 will remain at the same geographic position. Therefore, the relative compass heading 253 can be calculated individually for each wind turbine one-time and be stored into a configuration file as a reference information.

In a next step, by applying the Pseudo-Doppler RDF based on the signal 233 received at the receiver 215 via the antenna 218, the direction from the antenna 218 towards the transmitter 232 is determined.

It should be noted, that the direction from the antenna 218 toward the transmitter 232 is the same or almost the same as the direction from the nacelle 216 toward the transmitter 232 and the same or almost the same as the direction from the wind turbine 210 towards the transmitter 232.

Further, the determined direction which is presented at the orientation output 543 of the Pseudo-Doppler RDF receiver 500 is equal or almost equal to the calculated relative compass heading 253. Thus, the determined direction and the relative compass heading are labeled with the same index 253 in the description hereinafter.

As already mentioned above, the receiver 215 and the antenna 218 are calibrated such, that the 0°-direction is equal to the actual yaw direction 214 of the nacelle 216.

Consequently, as a further output of the Pseudo-Doppler RDF, a nacelle offset angle $\theta_{NacelleOffset}$ (indicated by an arrow 254 in the diagram 250) between the 0°-direction of the antenna 218 and the determined direction (which is equal to the calculated relative compass heading 253), can be derived. Based on the determined direction and the offset angle 254 the actual yaw direction (indicated by an arrow 214 in the diagram 250) can be determined.

Based on the offset angle 254 and/or the actual yaw direction 214 and based on the calculated relative compass heading 253 further geographic information may be derived dependent on the orientation or calibration of the geographic diagram 250.

As an example, a reference angle $\theta_{UTM}$ may be derived based on the relative compass heading 253 in relation to the cardinal direction "North" (indicated by the ordinate 252). The reference angle $\theta_{UTM}$ is indicated by an arrow 255 in the diagram 250.

Further, by subtracting the offset angle 254 from the reference angle 255 an absolute turbine yaw angle $\theta_{YawAngle}$ may be derived which is specific for each wind turbine 210 being part of the wind park installation 200. The absolute turbine yaw angle $\theta_{YawAngle}$ is indicated by an arrow 256 in the diagram 250.

The absolute turbine yaw angle 256 or the actual yaw direction 214 may be either updated continuously or sporadically to determine the actual yaw direction 214 or any further information concerning the actual position or direction of the rotor plane 220 or heading of the wind turbine or to calibrate the existing yaw encoder.

The proposed solution may be applicable to any wind turbines according to any of the following configurations:
- front mounted rotor (Forward facing) with active yaw,
- rear mounted rotor (Rear facing) with active yaw,
- any non-traditional direction dependent rotor configurations, and
- any passive yaw wind turbine with a direction dependent rotor configuration The proposed solution is independent from the design of the rotor or the nacelle, e.g., independent from the number of blades or from the shape of the nacelle.

Further, the proposed solution may be applicable to any Radio Direction Finding (RDF) method or technology capable for measuring or detecting the relative direction of a signal source.

The proposed solution may be further applicable to any embodiment of a radio transmitter as a source for broadcasting a signal at any transmission frequency. The possible range of possible frequencies to be used for the proposed solution maybe within or outside the UHF frequency band.

The proposed solution may be used for a constant or permanent monitoring of the yaw direction or yaw angle of a wind turbine or for a one-time only calibration of an existing yaw encoder.

According to a further embodiment of the proposed solution, the transmitter 232 may be configured such, that the signal 233 is broadcasted only within defined time intervals like, e.g., every 24 hours. Accordingly, the receiver 215 mounted at the wind turbine has be activated, i.e. synchronized, within the same time intervals. Beneficially, power consumption can be reduced at transmitter side as well as on receiver side.

Calculating the relative compass heading between two defined geographic positions:

Using a geographic coordinate system according to UTM:

The UTM (Universal Transverse Mercator) system of coordinates is a common system used in industry. This system breaks the globe into 60 zones each of which is then measured using meters north and east. These measurements are called "eastings" and "northings" and are designated as mE (meters east) and mN (meters north), respectively.

In nearly all cases a wind farm will exist entirely within one of the 60 zones. In the event that it falls on the border between two zones, it will be important that both the turbine and the reference point are in the same zone.

Calculating an angle from one point to another using UTM coordinates is straightforward. To determine a bearing $\theta$, (which is corresponding with the reference angle 255 of FIG. 2) from the turbine coordinates (Easting$_1$ (i.e. X1 in FIG. 2), Northing$_1$ (i.e. Y1 in FIG. 2)) to a reference coordinate (Easting$_2$ (i.e. X2 in FIG. 2), Northing$_2$ (i.e. Y2 in FIG. 2)) the following equation can be used:

$$\theta = \tan^{-1}\left(\frac{Easting_2 - Easting_1}{Northing_2 - Northing_1}\right)$$

The expression $\tan^{-1}(x)$ will only calculate the correct bearing when the reference coordinate is to the northeast of the turbine coordinate.

This is because $$\tan^{-1}\left(\frac{y}{x}\right)$$

produces the same result as $$\tan^{-1}\left(\frac{-y}{-x}\right).$$

To correct this, the common function a tan 2(y,x) can be used to identify which quadrant the angle is in.

The results of a tan 2(y,x) will show angles greater than 180° as negative numbers. To convert this result to a range from 0° to 360° the following expression can be used:

$$\theta_{360} = \mod(\theta_{deg} + 360, 360)$$

Here mod(a,b) is the modulo function that returns the remainder of a divided by b.

The only thing remaining is to make sure that the result of a tan 2(x,y) is converted back to degrees by using the relation below.

$$180° = \pi_{radians}$$

By combining this all it is possible to calculate the bearing $\theta$ from one UTM coordinate to the other. As an example, a line of computer code could be written as the following:

$$\theta = \mod(A\ TAN\ 2(Easting2 - Easting1, Northing2 - Northing1)*(180/\pi) + 360, 360)$$

Using a geographic coordinate system according to Latitude and Longitude:

In place of using UTM coordinates, it is also possible to use the more traditional latitude and longitude coordinates. Calculating a bearing using this coordinate system is a bit more complicated; although it is still possible using simple trigonometric functions.

Approximating the earth as a sphere, the initial bearing $\theta$ from the turbine coordinate (long$_1$ (i.e. X1 in FIG. 2), lat$_1$ (i.e. Y1 in FIG. 2)) to the reference coordinate (long$_2$ (i.e. X2 in FIG. 2), lat$_2$ (i.e. Y2 in FIG. 2)) can be calculated using the following equation:

$$\theta = \tan^{-1}\left(\frac{\cos(lat_1)\sin(lat_2) - \sin(lat_1)\cos(lat_2)\cos(long_2 - long_1)}{\sin(long_2 - long_1)\cos(lat_2)}\right)$$

However, for short distances, such as those on a wind farm, the lines of longitude around the earth can be considered to be parallel. Using this simplification the complex equation above can be simplified to the following:

$$\theta = \tan^{-1}\left(\frac{\text{lat}_2 - \text{lat}_1}{\cos(\text{lat}_1)(\text{long}_2 - \text{long}_1)}\right)$$

The expression $\tan^{-1}(x)$ only gives correct answers for coordinates located in the Eastern Hemisphere of the globe when using the Decimal Degree format to represent latitude and longitude.

Therefore, this function will also use a tan 2(y,x). Similarly, mod(a,b) is also used as before.

It is also necessary to make sure that the angle within the cos(x) function is expressed as radians and that the result of a tan 2(x,y) is converted back to degrees by using the relationship between degrees and radians above.

By combining this all it is possible to calculate the bearing θ from the turbine coordinate to the reference coordinate. As an example a line of computer code could be written as the following:

$$\theta = \text{mod}(a\tan 2(\text{lat}_2-\text{lat}_1, \text{COS}(\text{lat}_1*\pi/180)*(\text{long}_2-\text{long}_1))*(180/\pi)+360, 360)$$

Although the invention is described in detail by the embodiments above, it is noted that the invention is not at all limited to such embodiments. In particular, alternatives can be derived by a person skilled in the art from the exemplary embodiments and the illustrations without exceeding the scope of this invention.

The invention claimed is:

1. A method for determining a yaw direction of a wind turbine comprising:
    activating, by a processor of a computing system, a receiver coupled to the wind turbine to receive a signal broadcasted from a source, wherein the receiver is synchronized with a transmitter associated with the source, such that the receiver is activated at a same time interval as the transmitter when the transmitter transmits the signal;
    applying, by the processor, a Pseudo-Doppler Radio Direction Finding based on the signal received by the receiver;
    acquiring, by the processor, as a function of applying the Pseudo-Doppler Radio Direction Finding, a direction from the receiver towards the source, and an offset angle;
    determining, by the processor, the yaw direction of the wind turbine, using the offset angle and the direction from the receiver towards the source.

2. The method according claim 1, wherein:
    the receiver has a calibrated 0°-direction in relation to a direction of the receiver; and
    the offset angle is determined based on the calibrated 0°-direction in relation to the determined direction.

3. The method according to claim 2, wherein:
    the signal is broadcasted from the source located at a source-specific geographic position;
    the broadcasted signal is received at a component-specific geographic position;
    a relative compass heading is derived by processing the component-specific geographic position and the source-specific geographic position; and
    a yaw angle of the wind turbine is derived based on the offset angle, and on the relative compass heading.

4. The method according to claim 3, wherein the yaw angle is determined in relation towards a defined cardinal direction.

5. The method according to claim 1, wherein the broadcasted signal is received at a nacelle or rotor of the wind turbine.

6. The method according to claim 1, wherein the yaw direction is determined:
    continuously, periodically, within at least one defined time interval, or one-time.

7. The method according to claim 1, wherein a geographic position is defined according to:
    a Geographic Latitude and Longitude coordinate system, an Universal Transverse Mercator coordinate system, or an Universal Polar Stereographic coordinate system.

8. The method according to claim 1, further comprising: performing, by the processor, a sector management control function, using the yaw direction of the wind turbine.

9. A wind turbine, comprising:
    a receiver for receiving a signal broadcasted from a source, the receiver being synchronized with a transmitter associated with the source;
    a processor for:
        activating, by the processor, the receiver coupled to the wind turbine to receive the signal, wherein the receiver is activated at a same time interval as the transmitter when the transmitter transmits the signal;
        applying, by the processor, a Pseudo-Doppler Radio Direction Finding based on the signal received by the receiver;
        acquiring, by the processor, as a function of applying the Pseudo-Doppler Radio Direction Finding, a direction from the receiver towards the source, and an offset angle; and
        determining, by the processor, the yaw direction of the wind turbine, using the offset angle and the direction from the receiver towards the source.

10. A device comprising a processor for implementing the steps of a method, the method comprising:
    activating, by the processor, a receiver coupled to the wind turbine to receive a signal broadcasted from a source, wherein the receiver is synchronized with a transmitter associated with the source, such that the receiver is activated at a same time interval as the transmitter when the transmitter transmits the signal;
    applying, by the processor, a Pseudo-Doppler Radio Direction Finding based on the signal received by the receiver;
    acquiring, by the processor, as a function of applying the Pseudo-Doppler Radio Direction Finding, a direction from the receiver towards the source, and an offset angle;
    determining, by the processor, the yaw direction of the wind turbine, using the offset angle and the direction from the receiver towards the source.

11. The device according to claim 10, wherein the device is a yaw encoder.

12. The device according to claim 10, further comprising: performing, by the processor, a sector management control function, using the yaw direction of the wind turbine.

13. A computer program product, comprising a computer readable hardware storage device storing a computer readable program code, the computer readable program code comprising an algorithm that when executed by a computer processor of a computing system implements a method, the method comprising:
    activating, by the processor, a receiver coupled to the wind turbine to receive a signal broadcasted from a source, wherein the receiver is synchronized with a transmitter associated with the source, such that the receiver is activated at a same time interval as the transmitter when the transmitter transmits the signal;

applying, by the processor, a Pseudo-Doppler Radio Direction Finding based on the signal received by the receiver;

acquiring, by the processor, as a function of applying the Pseudo-Doppler Radio Direction Finding, a direction from the receiver towards the source, and an offset angle;

determining, by the processor, the yaw direction of the wind turbine, using the offset angle and the direction from the receiver towards the source.

14. The computer program product according to claim 13, further comprising: performing, by the processor, a sector management control function, using the yaw direction of the wind turbine.

* * * * *